United States Patent
Chu et al.

(10) Patent No.: US 10,064,147 B2
(45) Date of Patent: Aug. 28, 2018

(54) SYNCHRONIZATION METHOD, SYNCHRONIZATION APPRATUS, AND BASE STATION

(71) Applicant: HUAWEI TECHNOLOGIES CO., LTD., Shenzhen, Guangdong (CN)

(72) Inventors: Yuhong Chu, Shenzhen (CN); Zhidong Zhang, Shenzhen (CN); Jun Hu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 97 days.

(21) Appl. No.: 15/363,299

(22) Filed: Nov. 29, 2016

(65) Prior Publication Data

US 2017/0078990 A1    Mar. 16, 2017

Related U.S. Application Data

(63) Continuation of application No. PCT/CN2014/079021, filed on May 30, 2014.

(51) Int. Cl.
*H04W 56/00* (2009.01)
*H04L 5/00* (2006.01)
(Continued)

(52) U.S. Cl.
CPC ......... *H04W 56/001* (2013.01); *H04L 5/0048* (2013.01); *H04W 24/10* (2013.01);
(Continued)

(58) Field of Classification Search
CPC .. H04B 7/0413; H04B 7/0465; H04B 7/0482; H04W 52/44; H04W 52/50
See application file for complete search history.

(56) References Cited

U.S. PATENT DOCUMENTS

2007/0230510 A1    10/2007   You et al.
2008/0305804 A1    12/2008   Lee et al.
(Continued)

FOREIGN PATENT DOCUMENTS

CN    101448314 A    6/2009
CN    101510801 A    8/2009
(Continued)

OTHER PUBLICATIONS

Japanese Office Action dated Feb. 13, 2018 in corresponding Japanese Patent Application No. 2017-514755, 11 pgs.
(Continued)

*Primary Examiner* — Chandrahas B Patel
(74) *Attorney, Agent, or Firm* — Staas & Halsey LLP

(57) ABSTRACT

Embodiments of the present invention provide a synchronization method, a synchronization apparatus, and a base station, which can implement strict synchronization between base stations with relatively low costs and relatively high security and reliability. The method includes: determining reference user equipment UE, where the reference UE can communicate with a reference base station and a to-be-synchronized base station at the same time, and the reference base station and the to-be-synchronized base station have completed frequency synchronization relative to a same clock reference source; determining timing offset between the to-be-synchronized base station and the reference base station according to a moment at which the reference base station and the to-be-synchronized base station receive a synchronization reference signal that is sent by the reference UE; and performing calibration on the to-be-synchronized base station according to the timing offset.

20 Claims, 5 Drawing Sheets

(51) Int. Cl.
  *H04W 36/00* (2009.01)
  *H04W 24/10* (2009.01)
  *H04W 36/18* (2009.01)
  *H04W 88/08* (2009.01)
(52) U.S. Cl.
  CPC ......... *H04W 36/00* (2013.01); *H04W 56/004* (2013.01); *H04W 56/0015* (2013.01); *H04W 56/0045* (2013.01); *H04W 56/0065* (2013.01); *H04W 36/18* (2013.01); *H04W 88/08* (2013.01)

(56) References Cited

U.S. PATENT DOCUMENTS

| | | |
|---|---|---|
| 2011/0058503 A1 | 3/2011 | Ono |
| 2012/0071181 A1 | 3/2012 | Guillouard et al. |
| 2012/0236977 A1 | 9/2012 | Zou et al. |
| 2013/0012212 A1 | 1/2013 | Murakami et al. |
| 2013/0265992 A1 | 10/2013 | Deng et al. |
| 2016/0088579 A1* | 3/2016 | Harada ................ H04W 48/10 370/336 |
| 2016/0112978 A1 | 4/2016 | Hu |

FOREIGN PATENT DOCUMENTS

| | | |
|---|---|---|
| CN | 102547961 A | 7/2012 |
| CN | 103200665 A | 7/2013 |
| CN | 103797870 A | 5/2014 |
| EP | 2106157 A1 | 9/2009 |
| EP | 3001740 A1 | 3/2016 |
| JP | 2000-134667 | 5/2000 |
| JP | 2009-284315 | 12/2009 |
| JP | 2010-278546 | 12/2010 |
| JP | 2012-517171 | 7/2012 |
| JP | 2014-505394 | 2/2014 |
| JP | 2016-528770 | 9/2016 |
| KR | 1020070079505 | 8/2007 |
| KR | 1020110115130 | 10/2011 |
| KR | 1020140005297 | 1/2014 |
| WO | 2011/043413 A1 | 4/2011 |

OTHER PUBLICATIONS

International Search Report dated Mar. 3, 2015 in corresponding International Patent Application No. PCT/CN2014/079021.
Extended European Search Report dated May 18, 2017 in corresponding European Patent Application No. 14893105.8.
International Search Report dated Mar. 3, 2015 in corresponding International Application No. PCT/CN2014/079021.
Notice of Allowance, dated May 24, 2018, in Korean Application No. 1020167036358 (3 pp.).

* cited by examiner

SYNCHRONIZATION METHOD, SYNCHRONIZATION APPRATUS, AND BASE STATION

CROSS-REFERENCE TO RELATED APPLICATIONS

This application is a continuation of International Application No. PCT/CN2014/079021, filed on May 30, 2014, the disclosure of which is hereby incorporated by reference in its entirety.

TECHNICAL FIELD

The present invention relates to the communications field, and more specifically, to a synchronization method, a synchronization apparatus, and a base station.

BACKGROUND

In a cellular network communications system, quality of synchronization between base stations directly affects quality of a wireless communication service. With expansion of coverage of a radio base station and improvement of a network, to improve overall user satisfaction, and optimize indicators such as a call drop rate, a call completion rate, a paging success rate, and crosstalk of the network, synchronization between base stations needs to be considered when a transport and backbone synchronization network is built for a wireless network, so that good synchronization performance is extended to a network endpoint to improve overall running indicators of the network.

In a time division system, synchronization is of great necessity and importance. Strict frame number and frame timing synchronization is required between base stations of the time division system; otherwise, mutual interference is caused, and normal operation of a service is affected. In a frequency division system, strict frame number and frame timing synchronization between base stations is not required for some basic services, but when the frequency division system needs to support enhanced services such as an evolved multimedia broadcast and multicast service (eM-BMS) and central scheduling power control (CSPC), strict frame number and frame timing synchronization is also required between base stations.

At present, a main technical solution for implementing strict synchronization between radio base stations is to adopt a Global Positioning System (GPS) time service solution, that is, a GPS time service receiver is installed on each base station to receive a time service from a satellite so that base stations perform clock synchronization. Because time references output by different GPS time service receivers are strictly synchronous, frame timing and frame number synchronization may be easily implemented between base stations. Base station clock synchronization of wireless networks all over the world, such as Code Division Multiple Access (CDMA), Time Division-Synchronous Code Division Multiple Access (TD-SCDMA), Long Term Evolution-Time Division Duplex (LTE-TDD), and Worldwide Interoperability for Microwave Access (WIMAX) of time division duplex, basically uses the GPS as a time service reference for base stations. Although the GPS time service solution may well meet a strict phase synchronization requirement between base stations, material costs of a GPS time service are relatively high, engineering installation is difficult, fault maintenance costs are high, and security and reliability are relatively low. Similarly, when another global navigation satellite system (GNSS) such as a GLONASS, GALILEO, or BEIDOU system is used for a base station time service, same problems also exist.

SUMMARY

Embodiments of the present invention provide a synchronization method, a synchronization apparatus, and a base station, which can implement strict synchronization between base stations with relatively low costs and relatively high security and reliability.

According to a first aspect, a synchronization method is provided, including: determining reference user equipment UE, where the reference UE can communicate with a reference base station and a to-be-synchronized base station at the same time, and the reference base station and the to-be-synchronized base station have completed frequency synchronization relative to a same clock reference source; determining timing offset between the to-be-synchronized base station and the reference base station according to a moment at which the reference base station and the to-be-synchronized base station receive a synchronization reference signal that is sent by the reference UE; and performing calibration on the to-be-synchronized base station according to the timing offset, so that the to-be-synchronized base station completes frame number and frame timing synchronization relative to the reference base station.

With reference to the first aspect, in a first implementation manner of the first aspect, before the determining timing offset between the to-be-synchronized base station and the reference base station according to a relative moment at which the reference base station and the to-be-synchronized base station receive a synchronization reference signal that is sent by the reference UE, the method further includes: receiving a moment T1 that is sent by the reference base station and at which the reference base station receives the synchronization reference signal, where the moment T1 is a relative moment that is determined based on a current frame number and frame timing of the reference base station and at which the reference base station receives the synchronization reference signal; and receiving a moment T2 that is sent by the to-be-synchronized base station and at which the to-be-synchronized base station receives the synchronization reference signal, where the moment T2 is a relative moment that is determined based on a current frame number and frame timing of the to-be-synchronized base station and at which the to-be-synchronized base station receives the synchronization reference signal.

With reference to the first aspect and the foregoing implementation manner, in a second implementation manner of the first aspect, the determining timing offset between the to-be-synchronized base station and the reference base station according to a relative moment at which the reference base station and the to-be-synchronized base station receive a synchronization reference signal that is sent by the reference UE includes: determining the timing offset $\Delta T=T1-T2$ between the reference base station and the to-be-synchronized base station according to the relative moment T1 and the relative moment T2.

With reference to the first aspect and the foregoing implementation manners, in a third implementation manner of the first aspect, before the determining timing offset between the to-be-synchronized base station and the reference base station according to a relative moment at which the reference base station and the to-be-synchronized base station receive a synchronization reference signal that is sent by the reference UE, the method further includes: determining a round-trip delay RTD measurement result TA1 of the reference UE and the reference base station; determining an RTD measurement result TA2 of the reference UE and the to-be-synchronized base station; and determining, according to the measurement result TA1 and the measurement result TA2, a deviation TA1−TA2 that is caused by a difference between a distance from the reference UE to the reference base station and a distance from the reference UE to the to-be-synchronized base station.

With reference to the first aspect and the foregoing implementation manners, in a fourth implementation manner of the first aspect, the determining timing offset between the to-be-synchronized base station and the reference base station according to a relative moment at which the reference base station and the to-be-synchronized base station receive a synchronization reference signal that is sent by the reference UE includes: determining the timing offset ΔT=T1−T2−(TA1−TA2) between the reference base station and the to-be-synchronized base station according to the relative moment T1, the relative moment T2, and the deviation TA1−TA2.

With reference to the first aspect and the foregoing implementation manners, in a fifth implementation manner of the first aspect, before the determining reference user equipment UE, the method further includes: determining at least one synchronization group, where each synchronization group of the at least one synchronization group includes at least two base stations; and determining the reference base station and the to-be-synchronized base station from the at least two base stations that are included in each synchronization group.

With reference to the first aspect and the foregoing implementation manners, in a sixth implementation manner of the first aspect, when the at least one synchronization group includes multiple synchronization groups, the determining the reference base station and the to-be-synchronized base station from the at least two base stations that are included in each synchronization group includes: determining, from the at least two base stations that are included in each synchronization group, a base station that can receive a Global Positioning System GPS time service as the reference base station, where a frame number and frame timing of the reference base station of each synchronization group are synchronized with the GPS.

With reference to the first aspect and the foregoing implementation manners, in a seventh implementation manner of the first aspect, after the performing calibration on the to-be-synchronized base station according to the timing offset, the method further includes: when a service is idle, periodically determining the timing offset between the reference base station and the to-be-synchronized base station; and when the timing offset is greater than a first threshold and less than a second threshold, enabling the reference base station and the to-be-synchronized base station to perform the frequency synchronization relative to the same clock reference source; or when the timing offset is greater than a second threshold, performing the calibration on the to-be-synchronized base station according to the timing offset, so that the to-be-synchronized base station completes the frame number and frame timing synchronization relative to the reference base station.

With reference to the first aspect and the foregoing implementation manners, in an eighth implementation manner of the first aspect, after the performing calibration on the to-be-synchronized base station according to the timing offset, the method further includes: when it is detected that the reference base station or the to-be-synchronized base station restarts, redetermining timing offset, so that the to-be-synchronized base station performs calibration on the to-be-synchronized base station according to the redetermined timing offset and the to-be-synchronized base station completes the frame number and frame timing synchronization relative to the reference base station.

With reference to the first aspect and the foregoing implementation manners, in a ninth implementation manner of the first aspect, the synchronization reference signal sent by the reference UE includes at least one of the following: a physical random access channel PRACH; a sounding reference signal SRS; or a demodulation reference signal DMRS.

With reference to the first aspect and the foregoing implementation manners, in a tenth implementation manner of the first aspect, networking is performed between the reference base station and the to-be-synchronized base station by using a synchronous Ethernet or a time division multiplexing TDM synchronization network.

According to a second aspect, a synchronization apparatus is provided, including: a first determining unit, configured to determine reference user equipment UE, where the reference UE can communicate with a reference base station and a to-be-synchronized base station at the same time, and the reference base station and the to-be-synchronized base station have completed frequency synchronization relative to a same clock reference source; a second determining unit, configured to determine timing offset between the to-be-synchronized base station and the reference base station according to a moment at which the reference base station and the to-be-synchronized base station receive a synchronization reference signal that is sent by the reference UE; and a synchronization calibration unit, configured to perform calibration on the to-be-synchronized base station according to the timing offset, so that the to-be-synchronized base station completes frame number and frame timing synchronization relative to the reference base station.

With reference to the second aspect, in a first implementation manner of the second aspect, the apparatus further includes a receiving unit, and the receiving unit is configured to: receive a moment T1 that is sent by the reference base station and at which the reference base station receives the synchronization reference signal, where the moment T1 is a relative moment that is determined based on a current frame number and frame timing of the reference base station and at which the reference base station receives the synchronization reference signal; and receive a moment T2 that is sent by the to-be-synchronized base station and at which the to-be-synchronized base station receives the synchronization reference signal, where the moment T2 is a relative moment that is determined based on a current frame number and frame timing of the to-be-synchronized base station and at which the to-be-synchronized base station receives the synchronization reference signal.

With reference to the second aspect and the foregoing implementation manner, in a second implementation manner of the second aspect, the second determining unit is configured to: determine the timing offset ΔT=T1−T2 between the reference base station and the to-be-synchronized base station according to the relative moment T1 and the relative moment T2.

With reference to the second aspect and the foregoing implementation manners, in a third implementation manner of the second aspect, the second determining unit is further configured to: determine a round-trip delay RTD measurement result TA1 of the reference UE and the reference base station; determine an RTD measurement result TA2 of the reference UE and the to-be-synchronized base station; and determine, according to the measurement result TA1 and the measurement result TA2, a deviation TA1−TA2 that is caused by a difference between a distance from the reference UE to the reference base station and a distance from the reference UE to the to-be-synchronized base station.

With reference to the second aspect and the foregoing implementation manners, in a fourth implementation manner of the second aspect, the second determining unit is further configured to: determine the timing offset ΔT=T1−T2−(TA1−TA2) between the reference base station and the to-be-synchronized base station according to the relative moment T1, the relative moment T2, and the deviation TA1−TA2.

With reference to the second aspect and the foregoing implementation manners, in a fifth implementation manner of the second aspect, the first determining unit is further configured to: determine at least one synchronization group, where each synchronization group of the at least one synchronization group includes at least two base stations; and determine the reference base station and the to-be-synchronized base station from the at least two base stations that are included in each synchronization group.

With reference to the second aspect and the foregoing implementation manners, in a sixth implementation manner of the second aspect, when the at least one synchronization group includes multiple synchronization groups, the first determining unit is configured to: determine, from the at least two base stations that are included in each synchronization group, a base station that can receive a Global Positioning System GPS time service as the reference base station, where a frame number and frame timing of the reference base station of each synchronization group are synchronized with the GPS.

With reference to the second aspect and the foregoing implementation manners, in a seventh implementation manner of the second aspect, the synchronization calibration unit is further configured to: when a service is idle, periodically determine the timing offset between the reference base station and the to-be-synchronized base station by using the second determining unit; and when the timing offset is greater than a first threshold and less than a second threshold, enable the reference base station and the to-be-synchronized base station to perform the frequency synchronization relative to the same clock reference source; or when the timing offset is greater than a second threshold, perform the calibration on the to-be-synchronized base station according to the timing offset, so that the to-be-synchronized base station completes the frame number and frame timing synchronization relative to the reference base station.

With reference to the second aspect and the foregoing implementation manners, in an eighth implementation manner of the second aspect, the synchronization calibration unit is further configured to: when it is detected that the reference base station or the to-be-synchronized base station restarts, redetermine timing offset by using the second determining unit, and perform calibration on the to-be-synchronized base station according to the redetermined timing offset, so that the to-be-synchronized base station completes the frame number and frame timing synchronization relative to the reference base station.

With reference to the second aspect and the foregoing implementation manners, in a ninth implementation manner of the second aspect, the synchronization reference signal sent by the reference UE includes at least one of the following: a physical random access channel PRACH; a sounding reference signal SRS; or a demodulation reference signal DMRS.

With reference to the second aspect and the foregoing implementation manners, in a tenth implementation manner of the second aspect, networking is performed between the reference base station and the to-be-synchronized base station by using a synchronous Ethernet or a time division multiplexing TDM synchronization network.

According to a third aspect, a base station is provided, including the foregoing synchronization apparatus.

In the embodiments of the present invention, base stations that need to perform synchronization first perform frequency synchronization relative to a same clock reference source, and a reference base station is determined from the base stations that need to be synchronized, timing offset between a to-be-synchronized base station and the reference base station is determined by using a relative moment at which the to-be-synchronized base station and the reference base station receive a synchronization reference signal that is sent by reference UE, and frame number and frame timing synchronization calibration relative to the reference base station is performed on the to-be-synchronized base station according to the timing offset, thereby implementing strict synchronization between base stations with relatively low costs and relatively high security and reliability.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The technical solutions of the present invention may be applied to various communications systems such as a Global System for Mobile Communications (GSM), a Code Division Multiple Access (CDMA) system, Wideband Code Division Multiple Access (WCDMA), general packet radio service (GPRS), and Long Term Evolution (LTE).

User equipment (UE), which may also be referred to as a mobile terminal (Mobile Terminal), mobile user equipment, or the like, may communicate with one or more core networks by using a radio access network (such as RAN, Radio Access Network). The user equipment may be a mobile terminal, such as a mobile phone (or referred to as a "cellular" phone) and a computer with a mobile terminal, and for example, may be a portable, pocket-sized, handheld, computer built-in, or in-vehicle mobile apparatus, which exchanges voice and/or data with the radio access network.

A base station may be a base station (BTS, Base Transceiver Station) in the GSM or the CDMA, or may be a NodeB (NodeB) in the WCDMA, or may be an evolved NodeB (eNB or e-NodeB, evolutional Node B) in the LTE, which is not limited in the present invention.

Synchronization mainly includes system clock synchronization and frame synchronization, where the system clock synchronization refers to synchronization (bit timing) of clocks running inside all devices, and the frame synchronization refers to synchronization (frame timing synchronization) of frame signals for communication between base stations. After two base stations complete clock synchronization, frequencies are synchronized and no relative phase drift exists between the two base stations. However, when the two base stations do not complete frame number and frame timing synchronization, a timing relationship between the two base stations is still random, that is, a frame number and frame timing have a deviation but remain stable. In other words, to complete strict synchronization between base stations, it needs to be ensured that initial phases of frames of all base stations are consistent on the basis of completing clock synchronization.

Figure 1:
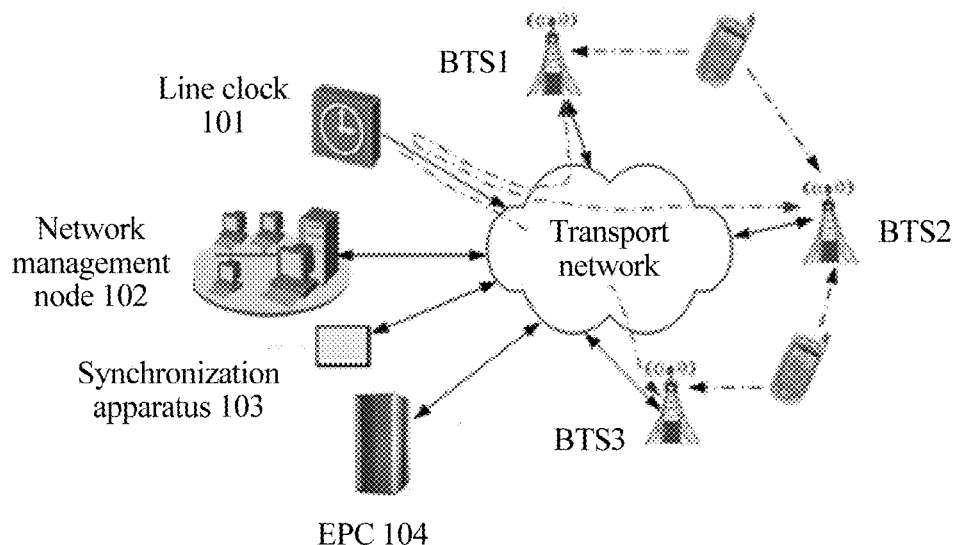
FIG. 1 is a diagram of a network architecture according to an embodiment of the present invention.

FIG. 1 is a diagram of a network architecture according to an embodiment of the present invention. FIG. 1 shows a mobile communications network that needs to perform synchronization between base stations.

It should be understood that a mobile communications system that performs synchronization between base stations may be a system such as GSM, CDMA, WCDMA, GPRS, or LTE, which is not limited in the present invention. FIG. 1 shows three base stations that need to perform synchronization: a BTS1, a BTS2, and a BTS3. The base station may be a BTS in the GSM or the CDMA, or may be a NodeB in the WCDMA, or may be an eNB or an e-NodeB in the LTE, which is not limited in the present invention.

In addition, a line clock 101, a network management node 102, a synchronization apparatus 103, an evolved packet core (EPC) 104, and the like are also shown; the foregoing network nodes and apparatuses are connected by using a transport network. The synchronization apparatus 103 may be individually deployed as a standalone device, or may be deployed on the network management node 102, the EPC 104, or any base station as a logical module. It should be understood that the foregoing examples are merely intended for description convenience, and network nodes, base stations, and apparatuses in a communications network are not limited to the foregoing types and quantities.

The BTS1, the BTS2, and the BTS3 need to complete strict synchronization between base stations. A synchronization process may be initiated by the synchronization apparatus 103, or may be initiated by an upper-layer network element such as the network management node 102, or be initiated by a base station that needs to be synchronized. First, three base stations may be synchronized with a same reference source by using the line clock 101 to implement frequency synchronization and archive phase drift consistency between the base stations. In a process of implementing the frequency synchronization or after the frequency synchronization is implemented, the synchronization apparatus 103 may determine a reference base station from the base stations that need to be synchronized, for example, determine the BTS2 as the reference base station. When frame number and frame timing synchronization is performed, the BTS1 and the BTS3 that serve as to-be-synchronized base stations may separately perform the synchronization with the reference base station BTS2. Specifically, using the BTS1 and the BTS2 as an example, the synchronization apparatus 103 may determine UE in a handover area of the BTS1 and the BTS2 as reference UE. The reference UE participates in measuring a frame number and frame timing deviation between the BTS1 and the BTS2. Then, the BTS1 completes calibration of a frame number and frame timing according to a measured frame timing deviation, to implement frame number and frame timing synchronization with the reference base station BTS2. Then, the BTS1 that completes the synchronization may serve as a reference base station for a next to-be-synchronized base station to perform synchronization.

After the synchronization is completed, the synchronization apparatus 103 may periodically start timing offset measurement between the base stations. When the timing offset between the base stations exceeds a specified range, recalibration is performed on the base stations.

Figure 2:
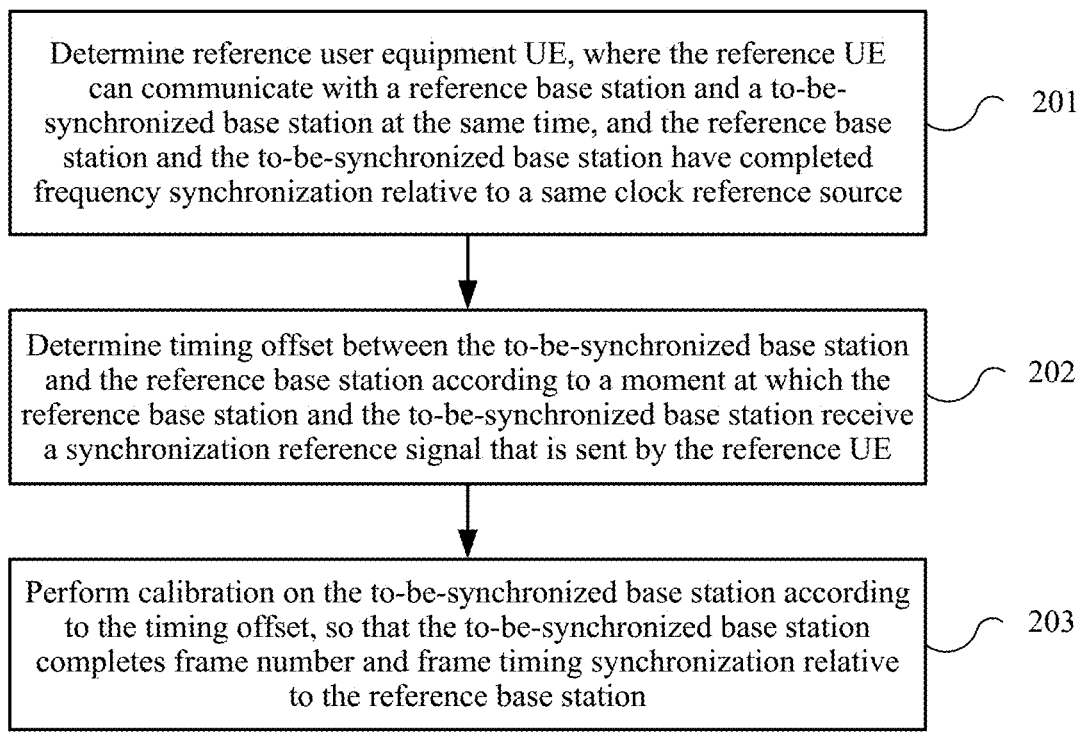
FIG. 2 is a flowchart of a synchronization method according to an embodiment of the present invention.

FIG. 2 is a flowchart of a synchronization method according to an embodiment of the present invention. The method in FIG. 2 may be executed by a base station, or may be executed by a synchronization apparatus.

201. Determine reference user equipment UE, where the reference UE can communicate with a reference base station and a to-be-synchronized base station at the same time, and the reference base station and the to-be-synchronized base station have completed frequency synchronization relative to a same clock reference source.

202. Determine timing offset between the to-be-synchronized base station and the reference base station according to a moment at which the reference base station and the to-be-synchronized base station receive a synchronization reference signal that is sent by the reference UE.

203. Perform calibration on the to-be-synchronized base station according to the timing offset, so that the to-be-synchronized base station completes frame number and frame timing synchronization relative to the reference base station.

In this embodiment of the present invention, base stations that need to perform synchronization first perform frequency synchronization relative to a same clock reference source, and a reference base station is determined from the base stations that need to be synchronized, timing offset between a to-be-synchronized base station and the reference base station is determined by using a relative moment at which the to-be-synchronized base station and the reference base station receive a synchronization reference signal that is sent by reference UE, and frame number and frame timing synchronization calibration relative to the reference base station is performed on the to-be-synchronized base station according to the timing offset, thereby implementing strict synchronization between base stations with relatively low costs and relatively high security and reliability, and without requiring network-wide protocol support.

This embodiment of the present invention may be executed by a synchronization apparatus, where the synchronization apparatus may be individually deployed as a standalone device, or may be deployed on a network management node, an EPC, or a base station as a logical module. The synchronization apparatus may be configured to determine a size of a coordination area, that is, to determine which base stations need to perform strict frame number and frame timing synchronization, and may be configured to determine a base station in the coordination area as the reference base station for the synchronization.

The base stations that need to be synchronized may be synchronized with the same clock reference source to implement frequency synchronization between base stations. Preferably, a line clock reference source may be a building integrated timing supply (BITS). Then, the frame number and frame timing synchronization between the base stations needs to be performed.

Optionally, in an embodiment, the reference UE may be determined by the synchronization apparatus, or the reference base station or the to-be-synchronized base station that participates in the synchronization. For example, the synchronization apparatus determines UE in a handover area that can communicate with the reference base station and the to-be-synchronized base station at the same time as the reference UE.

Optionally, in an embodiment, before step 202, the method further includes: receiving a moment T1 that is sent by the reference base station and at which the reference base station receives the synchronization reference signal, where the moment T1 is a relative moment that is determined based on a current frame number and frame timing of the reference base station and at which the reference base station receives the synchronization reference signal; and receiving a moment T2 that is sent by the to-be-synchronized base station and at which the to-be-synchronized base station receives the synchronization reference signal, where the moment T2 is a relative moment that is determined based on a current frame number and frame timing of the to-be-synchronized base station and at which the to-be-synchronized base station receives the synchronization reference signal.

After the reference UE is determined, the reference base station and the to-be-synchronized base station may receive a synchronization reference signal sent by the reference UE, which may be specifically an upstream access signal of the UE. The reference base station and the to-be-synchronized base station determine, respectively based on their own frame number and frame timing references, the accurate moments T1 and T2 at which the reference base station and the to-be-synchronized base station receive the upstream access signal of the UE. Then, the two base stations may respectively send T1 and T2 to the synchronization apparatus, and the synchronization apparatus performs subsequent processing. It should be understood that T1 is a moment determined by the reference base station relative to a timeline of the reference base station, that is, a relative moment, and similarly, T2 is also a relative moment.

The synchronization reference signal sent by the reference UE includes but is not limited to at least one of the following: a physical random access channel PRACH; a sounding reference signal SRS; or a demodulation reference signal DMRS.

Optionally, in an embodiment, step 202 includes: determining the timing offset $\Delta T = T1 - T2$ between the reference base station and the to-be-synchronized base station according to the relative moment T1 and the relative moment T2. By using a difference between the two relative moments, offset based on comparison between timelines of the two base stations may be determined, that is, a frame number and frame timing deviation between the two base stations. The to-be-synchronized base station may adjust its frame number and frame timing according to the timing offset $\Delta T$, thereby implementing frame number and frame timing synchronization with the reference base station.

Optionally, in an embodiment, before step 202, the method further includes: determining a round-trip delay RTD measurement result TA1 of the reference UE and the reference base station; determining an RTD measurement result TA2 of the reference UE and the to-be-synchronized base station; and determining, according to the measurement result TA1 and the measurement result TA2, a deviation TA1−TA2 that is caused by a difference between a distance from the reference UE to the reference base station and a distance from the reference UE to the to-be-synchronized base station.

Because distances from the reference UE to the two base stations (the reference base station and the to-be-synchronized base station) may be different, the foregoing $\Delta T = T1 - T2$ cannot reflect the timing offset that is introduced by the difference between the distances from the UE to the two base stations. Therefore, if more accurate timing offset between the two base stations needs to be obtained, the timing offset that is introduced by the difference between the distances from the reference UE to the two base stations needs to be calibrated. Specifically, the reference base station and the to-be-synchronized base station may separately perform the RTD measurement with the reference UE to obtain the timing offset (TA1−TA2) that is introduced by air-interface distances from the reference UE to the two base stations.

Optionally, in an embodiment, step 202 includes: determining the timing offset $\Delta T = T1 - T2 - (TA1 - TA2)$ between the reference base station and the to-be-synchronized base station according to the relative moment T1, the relative moment T2, and the deviation TA1−TA2. More accurate timing offset $\Delta T = T1 - T2 - (TA1 - TA2)$ between the base stations may be obtained according to a difference between the relative moments at which the two base stations receive the synchronization reference signal of the reference UE, and the timing offset that is introduced by the air-interface distances from the reference UE to the two base stations. The to-be-synchronized base station may adjust its frame number and frame timing according to the timing offset $\Delta T$, thereby implementing frame number and frame timing synchronization with the reference base station.

Optionally, in an embodiment, before the determining reference user equipment UE, the method further includes: determining at least one synchronization group, where each synchronization group of the at least one synchronization group includes at least two base stations; and determining the reference base station and the to-be-synchronized base station from the at least two base stations that are included in each synchronization group.

The synchronization apparatus may classify base stations that need to be synchronized in the coordination area into one or more synchronization groups, and determine one base station in each synchronization group as the reference base station, so as to accelerate a strict synchronization process between base stations when the coordination area is relatively large and there are many base stations that need to be synchronized.

Optionally, in an embodiment, when the at least one synchronization group includes multiple synchronization groups, the determining the reference base station and the to-be-synchronized base station from the at least two base stations that are included in each synchronization group includes: determining, from the at least two base stations that are included in each synchronization group, a base station that can receive a Global Positioning System GPS time service as the reference base station, where a frame number and frame timing of the reference base station of each synchronization group are synchronized with the GPS.

When there are multiple synchronization groups, the synchronization apparatus needs to determine one base station as the reference base station in each synchronization group. Because strict synchronization is required between the reference base stations in all synchronization groups, and the synchronization groups are usually far away from each other, the reference base stations may first be synchronized with a GPS clock source. That is, when determining a reference base station, the synchronization apparatus needs to determine a base station that can receive a GPS time service as the reference base station. After the reference base stations complete the strict synchronization, a to-be-synchronized base station in each synchronization group performs synchronization calibration with the reference base station in the group.

Optionally, in an embodiment, after step 203, the method further includes: periodically determining the timing offset between the reference base station and the to-be-synchronized base station; and when the timing offset is greater than a first threshold and less than a second threshold, enabling the reference base station and the to-be-synchronized base station to perform the frequency synchronization relative to the same clock reference source; or when the timing offset is greater than a second threshold, performing the calibration on the to-be-synchronized base station according to the timing offset, so that the to-be-synchronized base station completes the frame number and frame timing synchronization relative to the reference base station.

After the base station implements the synchronization, the UE may be periodically started to participate in measuring the timing offset between the base stations, and another base station apart from the reference base station may determine, according to a measurement result, whether to calibrate its own frame number and frame timing.

Preferably, the periodic measurement of the timing offset may be performed when a base station service is relatively idle, so as to minimize impact on the service. Periodic detection is mainly intended to improve reliability and robustness of a system. To minimize impact on the service, different processing measures may be used according to detected timing offset. If the timing offset is less than the first threshold, the calibration is not performed; or if the phase offset is great than the first threshold and less than the second threshold, the phase offset is adjusted in a frequency adjustment manner. When the timing offset is greater than the second threshold, a phase is directly adjusted. If the timing offset is equal to the second threshold, frequency adjustment or phase adjustment may be preset by the synchronization apparatus or the base station.

Optionally, in an embodiment, after step 203, the method further includes: when it is detected that the reference base station or the to-be-synchronized base station restarts, redetermining timing offset, so that the to-be-synchronized base station performs calibration on the to-be-synchronized base station according to the redetermined timing offset and the to-be-synchronized base station completes the frame number and frame timing synchronization relative to the reference base station.

Optionally, in an embodiment, networking is performed between the reference base station and the to-be-synchronized base station by using a synchronous Ethernet or a time division multiplexing TDM synchronization network.

In this embodiment of the present invention, base stations that need to perform synchronization first perform frequency synchronization relative to a same clock reference source, and a reference base station is determined from the base stations that need to be synchronized, timing offset between a to-be-synchronized base station and the reference base station is determined by using a relative moment at which the to-be-synchronized base station and the reference base station receive a synchronization reference signal that is sent by reference UE, and frame number and frame timing synchronization calibration relative to the reference base station is performed on the to-be-synchronized base station according to the timing offset, thereby implementing strict synchronization between base stations with relatively low costs and relatively high security and reliability, and without requiring network-wide protocol support.

Figure 3:
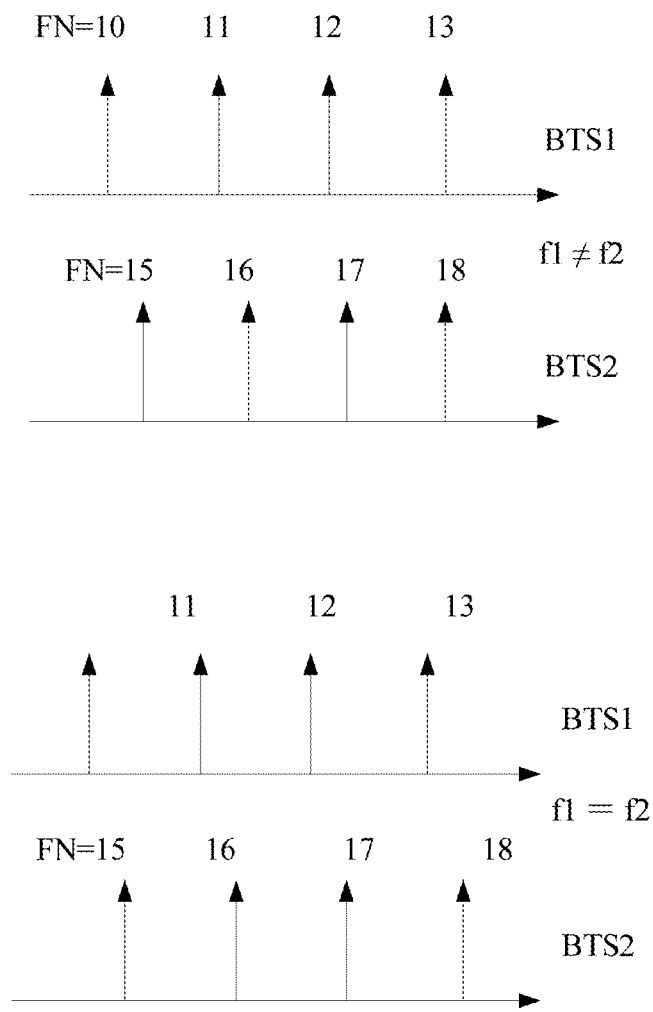
FIG. 3 is a schematic diagram of frequency synchronization between base stations according to an embodiment of the present invention.

FIG. 3 is a schematic diagram of frequency synchronization between base stations according to an embodiment of the present invention. FIG. 3 shows a frame timing difference between two base stations before frequency synchronization and a frame timing difference between the two base stations after frequency synchronization.

System clocks of two base stations, a BTS1 and a BTS2, that have not performed frequency synchronization between base stations respectively operate at f1 and f2, where f1≠f2. As shown in an upper part of FIG. 3, in this case, frame numbers and frame timing of the BTS1 and the BTS2 are irrelevant, and speeds of clock drifts of the BTS1 and the BTS2 are different because f1≠f2.

Figure 4:
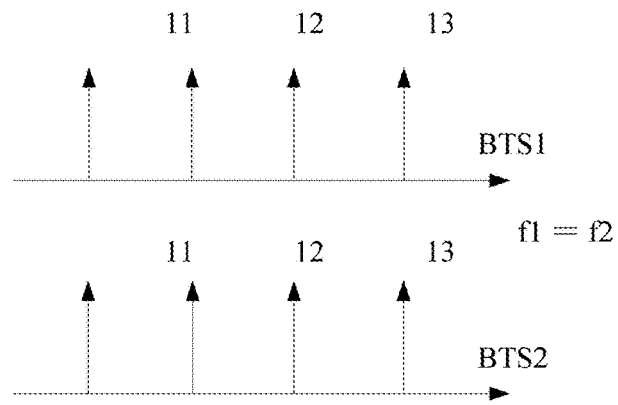
FIG. 4 is a schematic diagram of frame number and frame timing synchronization between base stations according to an embodiment of the present invention.

The two base stations are synchronized with a same clock reference source to implement the frequency synchronization between the two base stations. Using the BTS1 and the BTS2 in FIG. 3 as an example, the BTS1 and the BTS2 are synchronized with a BITS, and frequencies of the two base stations for sending radio frames are synchronized, that is, f1=f2. A line clock has only frequency information, and a timing relationship between the two base stations is still random, but the two base stations are synchronized with the same reference source in this case. Therefore, no relative phase drift exists, that is, a frame number and frame timing deviation remains stable. It can be seen from FIG. 3 that, the frame numbers and the frame timing of the base stations still deviate from each other, and strict synchronization is not achieved. FIG. 4 shows a frame phase relationship between the two base stations after frame number and frame timing synchronization is completed. With reference to measurement of a frame timing deviation, using FIG. 3 and FIG. 4 as an example, the BTS1 is a to-be-synchronized base station, and the BTS2 is a reference base station, where a phase relationship between the BTS1 and the BTS2 after the frequency synchronization is completed is shown in a lower part of FIG. 3. The BTS1 and the BTS2 receive a synchronization reference signal sent by reference UE, and the reference base station and the to-be-synchronized base station determine, respectively based on their own frame number and frame timing references, accurate moments T1 and T2 at which the reference base station and the to-besynchronized base station receive an upstream access signal of the UE, where timing offset ΔT=T1−T2 is 4.7 interface gaps (one interface gap spans from a beginning of a radio frame to a beginning of a next radio frame). As shown in FIG. 4, the BTS1 completes the frame number and frame timing synchronization relative to the BTS2 after performing calibration according to the ΔT.

Figure 5:
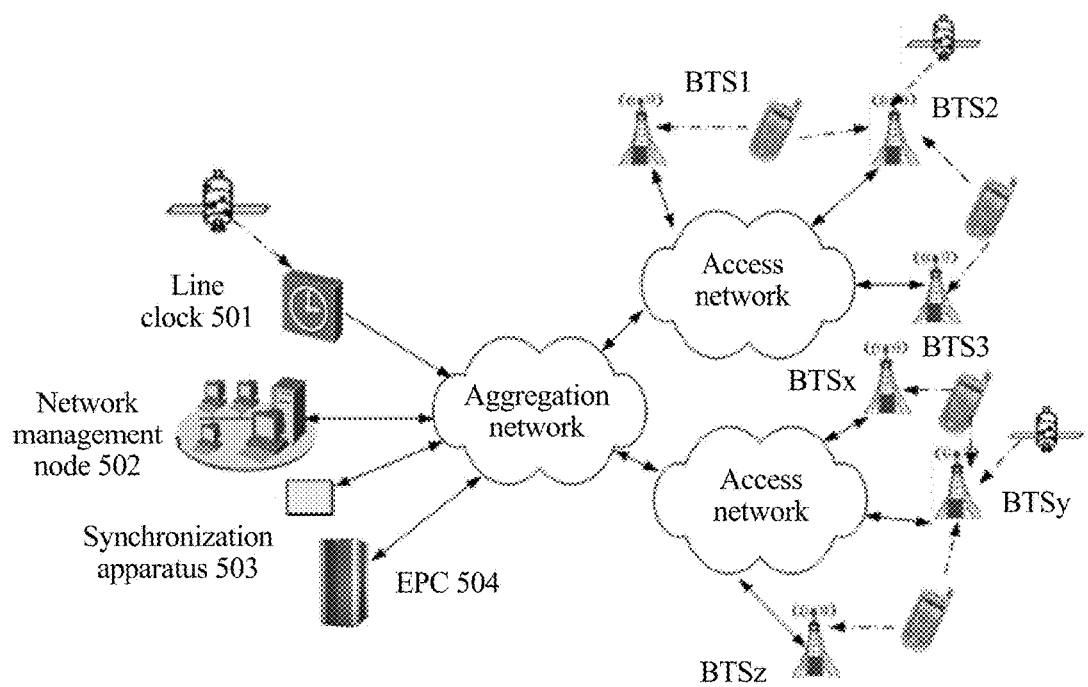
FIG. 5 is a diagram of a network architecture according to another embodiment of the present invention.

FIG. 5 is a diagram of a network architecture according to another embodiment of the present invention.

FIG. 5 shows six base stations that need to perform synchronization: a BTS1, a BTS2, a BTS3, a BTSx, a BTSy, and a BTSz. The base station may be a BTS in GSM or CDMA, or may be a NodeB in WCDMA, or may be an eNB or an e-NodeB in LTE, which is not limited in the present invention.

In addition, a line clock 501, a network management node 502, a synchronization apparatus 503, an evolved packet core (Evolved Packet Core, EPC) 504, and the like are also shown; the foregoing network nodes and apparatuses are connected by using a transport network. The synchronization apparatus 503 may be individually deployed as a standalone device, or may be deployed on the network management node 502, the EPC 504, or any base station as a logical module. It should be understood that the foregoing examples are merely intended for description convenience, and network nodes, base stations, and apparatuses in a communications network are not limited to the foregoing types and quantities.

When a coordination area is relatively large, that is, when there are many base stations that need to be synchronized, to accelerate a process of frame number and frame timing synchronization between the base stations, the relatively large coordination area may be divided into several relatively small coordination areas. In other words, the base stations such as the BTS1, the BTS2, the BTS3, the BTSx, the BTSy, and the BTSz that need to be synchronized may be classified into multiple synchronization groups. For example, the BTS1, the BTS2, and the BTS3 are classified into one synchronization group, and the BTSx, the BTSy, and the BTSz are classified into another synchronization group.

When there are multiple synchronization groups, the synchronization apparatus needs to determine one base station as a reference base station in each synchronization group, for example, determines the BTS2 as a reference base station of the BTS1, the BTS2, and the BTS3, and determines the BTSy as a reference base station of the BTSx, the BTSy, and the BTSz. Because strict synchronization is required between the reference base stations in all synchronization groups, and the synchronization groups are usually far away from each other, the reference base stations may first be synchronized with a GPS clock source. That is, when determining a reference base station, the synchronization apparatus needs to determine a base station that can receive a GPS time service as the reference base station. After the reference base stations complete the strict synchronization, a to-be-synchronized base station in each synchronization group performs synchronization calibration with the reference base station in the group. Using the BTS1, the BTS2, and the BTS3 as an example, the synchronization apparatus 503 may determine a reference base station from the base stations that need to be synchronized, for example, determine the BTS2 that can receive the GPS time service as the reference base station. When the frame number and frame timing synchronization is performed, the BTS1 and the BTS3 that serve as to-be-synchronized base stations may separately perform the synchronization with the reference base station BTS2. Specifically, using the BTS1 and the BTS2 as an example, the synchronization apparatus 503 may determine UE in a handover area of the BTS1 and the BTS2 as reference UE. The reference UE participates in measuring a frame number and frame timing deviation between the BTS1 and the BTS2. Then, the BTS1 completes calibration of a frame number and frame timing according to a measured frame timing deviation, to implement frame number and frame timing synchronization with the reference base station BTS2. Then, the BTS1 that completes the synchronization may serve as a reference base station for a next to-be-synchronized base station to perform synchronization. Frame number and frame timing synchronization of another synchronization group is similar, and details are not described herein.

After the synchronization is completed, the synchronization apparatus 503 may further periodically start timing offset measurement between the base stations. When the timing offset between the base stations exceeds a specified range, recalibration is performed on the base stations. Alternatively, when the base station restarts, recalibration may be performed within the synchronization group in which the base station is located.

Figure 6:
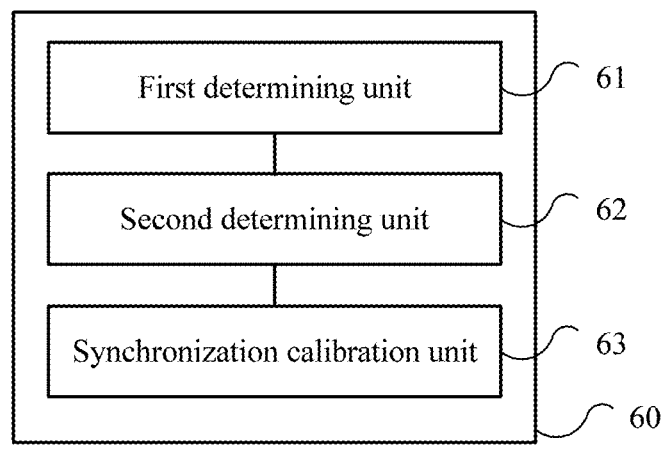
FIG. 6 is a schematic block diagram of a synchronization apparatus according to an embodiment of the present invention.

FIG. 6 is a schematic block diagram of a synchronization apparatus according to an embodiment of the present invention. A synchronization apparatus 60 in FIG. 6 includes a first determining unit 61, a second determining unit 62, and a synchronization calibration unit 63.

The first determining unit 61 determines reference user equipment UE, where the reference UE can communicate with a reference base station and a to-be-synchronized base station at the same time, and the reference base station and the to-be-synchronized base station have completed frequency synchronization relative to a same clock reference source. The second determining unit 62 determines timing offset between the to-be-synchronized base station and the reference base station according to a moment at which the reference base station and the to-be-synchronized base station receive a synchronization reference signal that is sent by the reference UE. The synchronization calibration unit 63 performs calibration on the to-be-synchronized base station according to the timing offset, so that the to-be-synchronized base station completes frame number and frame timing synchronization relative to the reference base station.

According to the synchronization apparatus 60 in this embodiment of the present invention, a reference base station is determined from base stations that need to be synchronized, timing offset between a to-be-synchronized base station and the reference base station is determined by using a relative moment at which the to-be-synchronized base station and the reference base station receive a synchronization reference signal that is sent by reference UE, and frame number and frame timing synchronization calibration relative to the reference base station is performed on the to-be-synchronized base station according to the timing offset, thereby implementing strict synchronization between base stations with relatively low costs and relatively high security and reliability, and without requiring network-wide protocol support.

The synchronization apparatus 60 may be individually deployed as a standalone device, or may be deployed on a network management node, an EPC, or a base station as a logical module. The synchronization apparatus 60 may be configured to determine a size of a coordination area, that is, to determine which base stations need to perform strict frame number and frame timing synchronization, and may be configured to determine a base station in the coordination area as the reference base station for the synchronization.

The base stations that need to be synchronized may be synchronized with the same clock reference source to implement frequency synchronization between the base stations. Preferably, a line clock reference source may be a building integrated timing supply (Building Integrated Timing System, BITS). Then, the frame number and frame timing synchronization between the base stations needs to be performed.

Optionally, in an embodiment, the synchronization apparatus 60 may further determine the reference UE by using the first determining unit 61. For example, the synchronization apparatus determines UE in a handover area that can communicate with the reference base station and the to-be-synchronized base station at the same time as the reference UE.

Optionally, in an embodiment, the apparatus 60 further includes a receiving unit, where the receiving unit is configured to: receive a moment T1 that is sent by the reference base station and at which the reference base station receives the synchronization reference signal, where the moment T1 is a relative moment that is determined based on a current frame number and frame timing of the reference base station and at which the reference base station receives the synchronization reference signal; and receive a moment T2 that is sent by the to-be-synchronized base station and at which the to-be-synchronized base station receives the synchronization reference signal, where the moment T2 is a relative moment that is determined based on a current frame number and frame timing of the to-be-synchronized base station and at which the to-be-synchronized base station receives the synchronization reference signal. After the reference UE is determined, the reference base station and the to-be-synchronized base station may receive a synchronization reference signal sent by the reference UE, which may be specifically an upstream access signal of the UE. The reference base station and the to-be-synchronized base station determine, respectively based on their own frame number and frame timing references, the accurate moments T1 and T2 at which the reference base station and the to-be-synchronized base station receive the upstream access signal of the UE. Then, the two base stations may respectively send T1 and T2 to the synchronization apparatus 60, and the synchronization apparatus 60 performs subsequent processing. It should be understood that T1 is a moment determined by the reference base station relative to a timeline of the reference base station, that is, a relative moment, and similarly, T2 is also a relative moment. The synchronization reference signal sent by the reference UE includes but is not limited to at least one of the following: a physical random access channel PRACH; a sounding reference signal SRS; or a demodulation reference signal DMRS.

Optionally, in an embodiment, the second determining unit 62 is configured to: determine the timing offset $\Delta T=T1-T2$ between the reference base station and the to-be-synchronized base station according to the relative moment T1 and the relative moment T2. By using a difference between the two relative moments, offset based on comparison between timelines of the two base stations may be determined, that is, a frame number and frame timing deviation between the two base stations. The to-be-synchronized base station may adjust its frame number and frame timing according to the timing offset $\Delta T$, thereby implementing frame number and frame timing synchronization with the reference base station.

Optionally, in an embodiment, the second determining unit 62 is further configured to: determine a round-trip delay RTD measurement result TA1 of the reference UE and the reference base station; determine an RTD measurement result TA2 of the reference UE and the to-be-synchronized base station; and determine, according to the measurement result TA1 and the measurement result TA2, a deviation TA1−TA2 that is caused by a difference between a distance from the reference UE to the reference base station and a distance from the reference UE to the to-be-synchronized base station. Because distances from the reference UE to the two base stations (the reference base station and the to-be-synchronized base station) may be different, the foregoing $\Delta T=T1-T2$ cannot reflect the timing offset that is introduced by the difference between the distances from the UE to the two base stations. Therefore, if more accurate timing offset between the two base stations needs to be obtained, the timing offset that is introduced by the difference between the distances from the reference UE to the two base stations needs to be calibrated. Specifically, the reference base station and the to-be-synchronized base station may separately perform the RTD measurement with the reference UE to obtain the timing offset (TA1−TA2) that is introduced by air-interface distances from the reference UE to the two base stations.

Optionally, in an embodiment, the second determining unit 62 is further configured to: determine the timing offset $\Delta T=T1-T2-(TA1-TA2)$ between the reference base station and the to-be-synchronized base station according to the relative moment T1, the relative moment T2, and the deviation TA1−TA2. More accurate timing offset $\Delta T=T1-T2-(TA1-TA2)$ between the base stations may be obtained according to a difference between the relative moments at which the two base stations receive the synchronization reference signal of the reference UE, and the timing offset that is introduced by the air-interface distances from the reference UE to the two base stations. The to-be-synchronized base station may adjust its frame number and frame timing according to the timing offset $\Delta T$, thereby implementing frame number and frame timing synchronization with the reference base station.

Optionally, in an embodiment, the first determining unit 61 is further configured to: determine at least one synchronization group, where each synchronization group of the at least one synchronization group includes at least two base stations; and determine the reference base station and the to-be-synchronized base station from the at least two base stations that are included in each synchronization group.

Optionally, in an embodiment, when the at least one synchronization group includes multiple synchronization groups, the first determining unit 61 is configured to: determine, from the at least two base stations that are included in each synchronization group, a base station that can receive a Global Positioning System GPS time service as the reference base station, where a frame number and frame timing of the reference base station of each synchronization group are synchronized with the GPS. When there are multiple synchronization groups, the synchronization apparatus needs to determine one base station as the reference base station in each synchronization group. Because strict synchronization is required between the reference base stations in all synchronization groups, and the synchronization groups are usually far away from each other, the reference base stations may first be synchronized with a GPS clock source. That is, when determining a reference base station, the synchronization apparatus needs to determine a base station that can receive a GPS time service as the reference base station. After the reference base stations complete the strict synchronization, a to-be-synchronized base station in each synchronization group performs synchronization calibration with the reference base station in the group.

Optionally, in an embodiment, the synchronization calibration unit 63 is further configured to: periodically determine the timing offset between the reference base station and the to-be-synchronized base station by using the second determining unit; and when the timing offset is greater than a first threshold and less than a second threshold, enable the reference base station and the to-be-synchronized base station to perform the frequency synchronization relative to the same clock reference source; or when the timing offset is greater than a second threshold, perform the calibration on the to-be-synchronized base station according to the timing offset, so that the to-be-synchronized base station completes the frame number and frame timing synchronization relative to the reference base station.

After the base station implements the synchronization, the synchronization apparatus 60 may periodically start the UE to participate in measuring the timing offset between the base stations, and another base station apart from the reference base station may determine, according to a measurement result, whether to calibrate its own frame number and frame timing. Preferably, the periodic measurement of the timing offset may be performed when a base station service is relatively idle, so as to minimize impact on the service. Periodic detection is mainly intended to improve reliability and robustness of a system. To minimize impact on the service, different processing measures may be used according to detected timing offset. If the phase offset is less than the first threshold, the calibration is not performed; or if the phase offset is greater than the first threshold and less than the second threshold, the phase offset is adjusted in a frequency adjustment manner. When the timing offset is greater than the second threshold, a phase is directly adjusted. If the timing offset is equal to the second threshold, frequency adjustment or phase adjustment may be preset by the synchronization apparatus or the base station.

Optionally, in an embodiment, the synchronization calibration unit 63 is further configured to: when it is detected that the reference base station or the to-be-synchronized base station restarts, redetermine timing offset by using the second determining unit, and perform calibration on the to-be-synchronized base station according to the redetermined timing offset, so that the to-be-synchronized base station completes the frame number and frame timing synchronization relative to the reference base station.

Optionally, in an embodiment, networking is performed between the reference base station and the to-be-synchronized base station by using a synchronous Ethernet or a time division multiplexing TDM synchronization network.

In this embodiment of the present invention, base stations that need to perform synchronization first perform frequency synchronization relative to a same clock reference source, and a synchronization apparatus 60 determines a reference base station from the base stations that need to be synchronized, determines timing offset between a to-be-synchronized base station and the reference base station by using a relative moment at which the to-be-synchronized base station and the reference base station receive a synchronization reference signal that is sent by reference UE, and performs frame number and frame timing synchronization calibration relative to the reference base station on the to-be-synchronized base station according to the timing offset, thereby implementing strict synchronization between base stations with relatively low costs and relatively high security and reliability, and without requiring network-wide protocol support.

Figure 7:
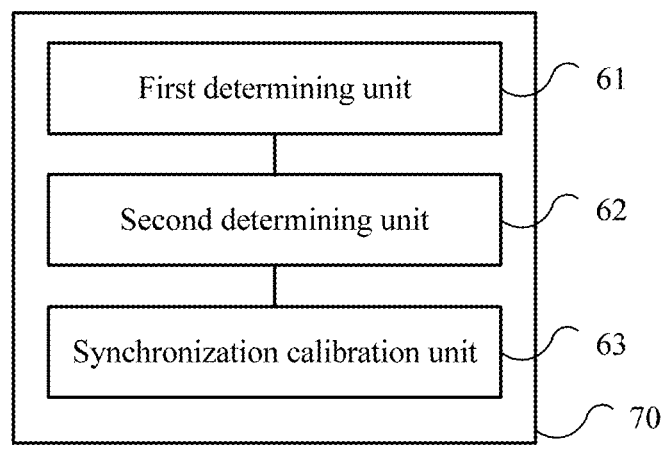
FIG. 7 is a schematic block diagram of a base station according to an embodiment of the present invention.

FIG. 7 is a schematic block diagram of a base station according to an embodiment of the present invention. A base station 70 shown in FIG. 7 includes a synchronization apparatus 60 in FIG. 6, and can execute a method in FIG. 2.

Figure 8:
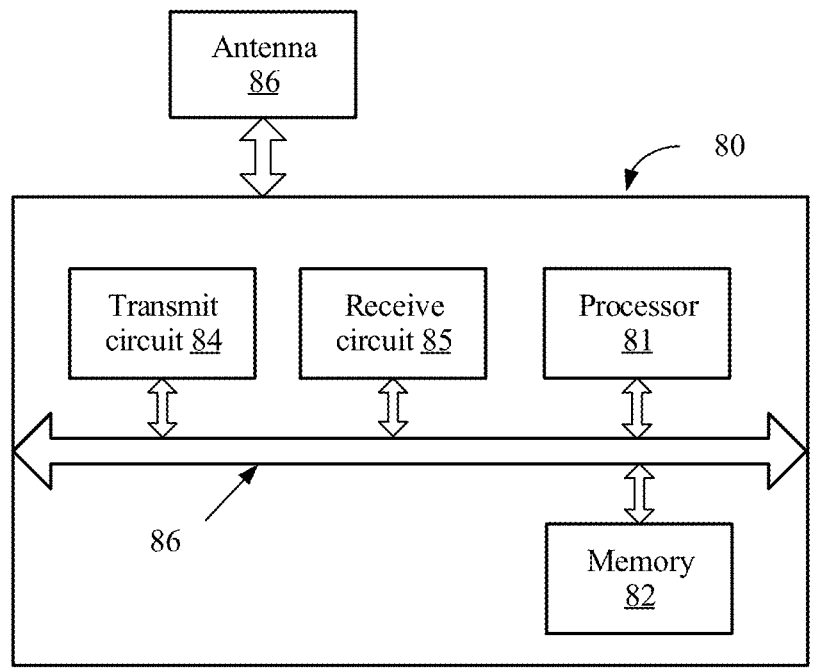
FIG. 8 is a schematic block diagram of a synchronization apparatus according to another embodiment of the present invention.

FIG. 8 is a schematic block diagram of a synchronization apparatus according to another embodiment of the present invention. A synchronization apparatus 80 in FIG. 8 includes a processor 81 and a memory 82. The processor 81 and the memory 82 are connected by using a bus system 83.

The memory 82 is configured to store an instruction that enables the processor 81 to perform the following operations: determining reference user equipment UE, where the reference UE can communicate with a reference base station and a to-be-synchronized base station at the same time, and the reference base station and the to-be-synchronized base station have completed frequency synchronization relative to a same clock reference source; determining timing offset between the to-be-synchronized base station and the reference base station according to a moment at which the reference base station and the to-be-synchronized base station receive a synchronization reference signal that is sent by the reference UE; and performing calibration on the to-be-synchronized base station according to the timing offset, so that the to-be-synchronized base station completes frame number and frame timing synchronization relative to the reference base station.

In this embodiment of the present invention, base stations that need to perform synchronization first perform frequency synchronization relative to a same clock reference source, and a synchronization apparatus 80 determines a reference base station from the base stations that need to be synchronized, determines timing offset between a to-be-synchronized base station and the reference base station by using a relative moment at which the to-be-synchronized base station and the reference base station receive a synchronization reference signal that is sent by reference UE, and performs frame number and frame timing synchronization calibration relative to the reference base station on the to-be-synchronized base station according to the timing offset, thereby implementing strict synchronization between base stations with relatively low costs and relatively high security and reliability, and without requiring network-wide protocol support.

The synchronization apparatus 80 may be individually deployed as a standalone device, or may be deployed on a network management node, an EPC, or a base station as a logical module. The synchronization apparatus 80 may be configured to determine a size of a coordination area, that is, to determine which base stations need to perform strict frame number and frame timing synchronization, and may be configured to determine a base station in the coordination area as the reference base station for the synchronization.

The base stations that need to be synchronized may be synchronized with the same clock reference source to implement frequency synchronization between the base stations. Preferably, a line clock reference source may be a building integrated timing supply (Building Integrated Timing System, BITS). Then, the frame number and frame timing synchronization between the base stations needs to be performed.

In addition, the synchronization apparatus 80 may further include a transmit circuit 84, a receive circuit 85, an antenna 86, and the like. The processor 81 controls an operation of the synchronization apparatus 80, and the processor 81 may further be referred to as a CPU (Central Processing Unit, central processing unit). The memory 82 may include a read-only memory and a random access memory, and provides an instruction and data for the processor 81. A part of the memory 82 may further include a nonvolatile random access memory (NVRAM). In a specific application, the transmit circuit 84 and the receive circuit 85 may be coupled to the antenna 86. Components of the synchronization apparatus 80 are coupled together by using the bus system 83, where the bus system 83, in addition to including a data bus, may further include a power bus, a control bus, a status signal bus, and the like. However, for clarity of description, various buses are marked as the bus system 83 in a figure.

The methods disclosed in the foregoing embodiments of the present invention may be applied to the processor 81, or implemented by the processor 81. The processor 81 may be an integrated circuit chip and has a signal processing capability. In an implementation process, the steps in the foregoing method may be completed by using an integrated logic circuit of hardware in the processor 81 or an instruction in a form of software. The foregoing processor 81 may be a general-purpose processor, a digital signal processor (DSP), an application-specific integrated circuit (ASIC), a field programmable gate array (FPGA) or another programmable logic device, a discrete gate or a transistor logic device, or a discrete hardware component. The methods, the steps, and the logical block diagrams that are disclosed in this embodiment of the present invention may be implemented or performed. The general-purpose processor may be a microprocessor, or the processor may also be any conventional processor, or the like. The steps of the methods disclosed with reference to the embodiments of the present invention may be directly performed and completed by a hardware decoding processor, or performed and completed by a combination of hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in the memory 82. The processor 81 reads information in the memory 82, and completes the steps of the foregoing methods in combination with hardware of the processor 81.

Optionally, in an embodiment, before the determining timing offset between the to-be-synchronized base station and the reference base station according to a relative moment at which the reference base station and the to-be-synchronized base station receive a synchronization reference signal that is sent by the reference UE, the method further includes: receiving a moment T1 that is sent by the reference base station and at which the reference base station receives the synchronization reference signal, where the moment T1 is a relative moment that is determined based on a current frame number and frame timing of the reference base station and at which the reference base station receives the synchronization reference signal; and receiving a moment T2 that is sent by the to-be-synchronized base station and at which the to-be-synchronized base station receives the synchronization reference signal, where the moment T2 is a relative moment that is determined based on a current frame number and frame timing of the to-be-synchronized base station and at which the to-be-synchronized base station receives the synchronization reference signal.

Optionally, in an embodiment, the determining timing offset between the to-be-synchronized base station and the reference base station according to a relative moment at which the reference base station and the to-be-synchronized base station receive a synchronization reference signal that is sent by the reference UE includes: determining the timing offset $\Delta T=T1-T2$ between the reference base station and the to-be-synchronized base station according to the relative moment T1 and the relative moment T2.

Optionally, in an embodiment, before the determining timing offset between the to-be-synchronized base station and the reference base station according to a relative moment at which the reference base station and the to-be-synchronized base station receive a synchronization reference signal that is sent by the reference UE, the method further includes: determining a round-trip delay RTD measurement result TA1 of the reference UE and the reference base station; determining an RTD measurement result TA2 of the reference UE and the to-be-synchronized base station; and determining, according to the measurement result TA1 and the measurement result TA2, a deviation TA1−TA2 that is caused by a difference between a distance from the reference UE to the reference base station and a distance from the reference UE to the to-be-synchronized base station.

Optionally, in an embodiment, the determining timing offset between the to-be-synchronized base station and the reference base station according to a relative moment at which the reference base station and the to-be-synchronized base station receive a synchronization reference signal that is sent by the reference UE includes: determining the timing offset $\Delta T=T1-T2-(TA1-TA2)$ between the reference base station and the to-be-synchronized base station according to the relative moment T1, the relative moment T2, and the deviation TA1−TA2.

Optionally, in an embodiment, before the determining reference user equipment UE, the method further includes: determining at least one synchronization group, where each synchronization group of the at least one synchronization group includes at least two base stations; and determining the reference base station and the to-be-synchronized base station from the at least two base stations that are included in each synchronization group.

Optionally, in an embodiment, when the at least one synchronization group includes multiple synchronization groups, the determining the reference base station and the to-be-synchronized base station from the at least two base stations that are included in each synchronization group includes: determining, from the at least two base stations that are included in each synchronization group, a base station that can receive a Global Positioning System GPS time service as the reference base station, where a frame number and frame timing of the reference base station of each synchronization group are synchronized with the GPS.

Optionally, in an embodiment, after the performing calibration on the to-be-synchronized base station according to the timing offset, the method further includes: when a service is idle, periodically determining the timing offset between the reference base station and the to-be-synchronized base station; and when the timing offset is greater than a first threshold and less than a second threshold, enabling the reference base station and the to-be-synchronized base station to perform the frequency synchronization relative to the same clock reference source; or when the timing offset is greater than a second threshold, performing the calibration on the to-be-synchronized base station according to the timing offset, so that the to-be-synchronized base station completes the frame number and frame timing synchronization relative to the reference base station.

Optionally, in an embodiment, after the performing calibration on the to-be-synchronized base station according to the timing offset, the method further includes: when it is detected that the reference base station or the to-be-synchronized base station restarts, redetermining timing offset, so that the to-be-synchronized base station performs calibration on the to-be-synchronized base station according to the redetermined timing offset and the to-be-synchronized base station completes the frame number and frame timing synchronization relative to the reference base station.

Optionally, in an embodiment, the synchronization reference signal sent by the reference UE includes at least one of the following: a physical random access channel PRACH; a sounding reference signal SRS; or a demodulation reference signal DMRS.

Optionally, in an embodiment, networking is performed between the reference base station and the to-be-synchronized base station by using a synchronous Ethernet or a time division multiplexing TDM synchronization network.

In this embodiment of the present invention, base stations that need to perform synchronization first perform frequency synchronization relative to a same clock reference source, and a reference base station is determined from the base stations that need to be synchronized, timing offset between a to-be-synchronized base station and the reference base station is determined by using a relative moment at which the to-be-synchronized base station and the reference base station receive a synchronization reference signal that is sent by reference UE, and frame number and frame timing synchronization calibration relative to the reference base station is performed on the to-be-synchronized base station according to the timing offset, thereby implementing strict synchronization between base stations with relatively low costs and relatively high security and reliability, and without requiring network-wide protocol support.

Figure 9:
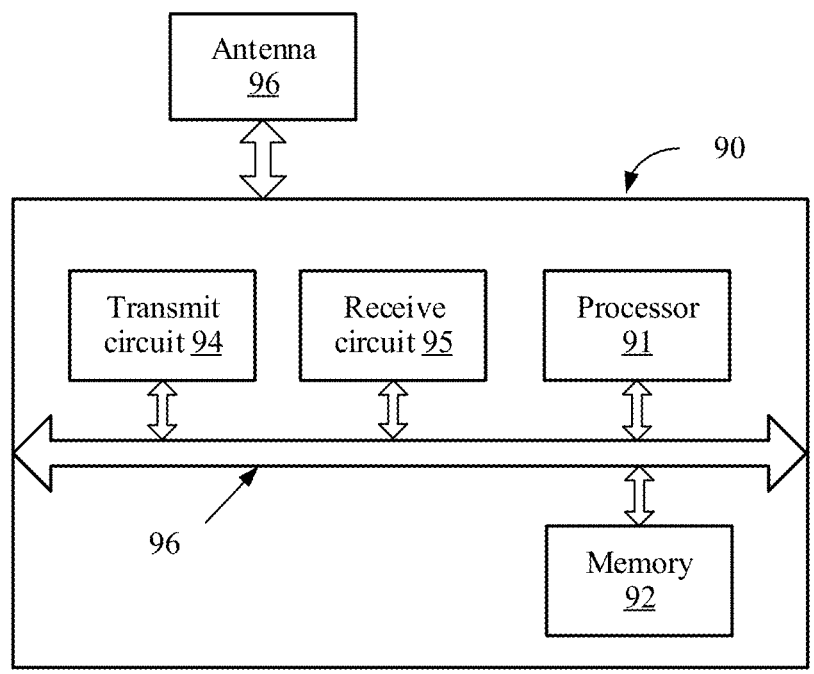
FIG. 9 is a schematic block diagram of a base station according to another embodiment of the present invention.

FIG. 9 is a schematic block diagram of a base station according to another embodiment of the present invention. A base station 90 in FIG. 9 includes a processor 91 and a memory 92. The processor 91 and the memory 92 are connected by using a bus system 93.

The memory 92 is configured to store an instruction that enables the processor 91 to perform the following operations: determining reference user equipment UE, where the reference UE can communicate with a reference base station and a to-be-synchronized base station at the same time, and the reference base station and the to-be-synchronized base station have completed frequency synchronization relative to a same clock reference source; determining timing offset between the to-be-synchronized base station and the reference base station according to a moment at which the reference base station and the to-be-synchronized base station receive a synchronization reference signal that is sent by the reference UE; and performing calibration on the to-be-synchronized base station according to the timing offset, so that the to-be-synchronized base station completes frame number and frame timing synchronization relative to the reference base station.

In this embodiment of the present invention, base stations that need to perform synchronization first perform frequency synchronization relative to a same clock reference source, and a base station 90 determines a reference base station from the base stations that need to be synchronized, determines timing offset between a to-be-synchronized base station and the reference base station by using a relative moment at which the to-be-synchronized base station and the reference base station receive a synchronization reference signal that is sent by reference UE, and performs frame number and frame timing synchronization calibration relative to the reference base station on the to-be-synchronized base station according to the timing offset, thereby implementing strict synchronization between base stations with relatively low costs and relatively high security and reliability, and without requiring network-wide protocol support.

The base station 90 includes a synchronization apparatus 80, and the base station 90 may be the foregoing to-be-synchronized base station, or may be the reference base station. The synchronization apparatus 80 may be configured to determine a size of a coordination area, that is, to determine which base stations need to perform strict frame number and frame timing synchronization, and may be configured to determine a base station in the coordination area as the reference base station for the synchronization.

The base stations that need to be synchronized may be synchronized with the same clock reference source to implement frequency synchronization between the base stations. Preferably, a line clock reference source may be a building integrated timing supply (Building Integrated Timing System, BITS). Then, the frame number and frame timing synchronization between the base stations needs to be performed.

In addition, the base station 90 may further include a transmit circuit 94, a receive circuit 95, an antenna 96, and the like. The processor 91 controls an operation of the base station 90, and the processor 91 may further be referred to as a CPU (Central Processing Unit, central processing unit). The memory 92 may include a read-only memory and a random access memory, and provides an instruction and data for the processor 91. A part of the memory 92 may further include a nonvolatile random access memory (NVRAM). In a specific application, the transmit circuit 94 and the receive circuit 95 may be coupled to the antenna 96. Components of the base station 90 are coupled together by using the bus system 93, where the bus system 93, in addition to including a data bus, may further include a power bus, a control bus, a status signal bus, and the like. However, for clarity of description, various buses are marked as the bus system 93 in a figure.

The methods disclosed in the foregoing embodiments of the present invention may be applied to the processor 91, or implemented by the processor 91. The processor 91 may be an integrated circuit chip and has a signal processing capability. In an implementation process, the steps in the foregoing method may be completed by using an integrated logic circuit of hardware in the processor 91 or an instruction in a form of software. The foregoing processor 91 may be a general-purpose processor, a digital signal processor (DSP), an application-specific integrated circuit (ASIC), a field programmable gate array (FPGA) or another programmable logic device, a discrete gate or a transistor logic device, or a discrete hardware component. The methods, the steps, and the logical block diagrams that are disclosed in this embodiment of the present invention may be implemented or performed. The general-purpose processor may be a microprocessor, or the processor may also be any conventional processor, or the like. The steps of the methods disclosed with reference to the embodiments of the present invention may be directly performed and completed by a hardware decoding processor, or performed and completed by a combination of hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in the memory 92. The processor 91 reads information in the memory 92, and completes the steps of the foregoing methods in combination with hardware of the processor 91.

It should be understood that the term "and/or" in this specification describes only an association relationship for describing associated objects and represents that three relationships may exist. For example, A and/or B may represent the following three cases: only A exists, both A and B exist, and only B exists. In addition, the character "/" in this specification generally indicates an "or" relationship between the associated objects.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be electronic, mechanical, or other forms.

The units described as separate parts may or may not be physically separate, and parts displayed as units may or may not be physical units, that is, the parts or the units may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each unit may exist alone physically, or two or more than two units may be integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device, or the like) to perform all or some of the steps of the methods in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A synchronization method, comprising:
   determining reference user equipment (UE), wherein the reference UE can communicate with a reference base station and a to-be-synchronized base station at the same time, and the reference base station and the to-be-synchronized base station have completed frequency synchronization relative to a same clock reference source;
   determining timing offset between the to-be-synchronized base station and the reference base station according to a moment at which the reference base station and the to-be-synchronized base station receive a synchronization reference signal that is sent by the reference UE; and
   performing calibration on the to-be-synchronized base station according to the timing offset, so that the to-be-synchronized base station completes frame number and frame timing synchronization relative to the reference base station.

2. The method according to claim 1, before the determining timing offset between the to-be-synchronized base station and the reference base station according to a moment at which the reference base station and the to-be-synchronized base station receive a synchronization reference signal that is sent by the reference UE, further comprising:
   receiving a moment T1 that is sent by the reference base station and at which the reference base station receives the synchronization reference signal, wherein the moment T1 is a relative moment that is determined based on a current frame number and frame timing of the reference base station and at which the reference base station receives the synchronization reference signal; and
   receiving a moment T2 that is sent by the to-be-synchronized base station and at which the to-be-synchronized base station receives the synchronization reference signal, wherein the moment T2 is a relative moment that is determined based on a current frame number and frame timing of the to-be-synchronized base station and at which the to-be-synchronized base station receives the synchronization reference signal.

3. The method according to claim 2, wherein the determining timing offset between the to-be-synchronized base station and the reference base station according to a moment at which the reference base station and the to-be-synchronized base station receive a synchronization reference signal that is sent by the reference UE comprises: determining the timing offset ΔT=T1−T2 between the reference base station and the to-be-synchronized base station according to the relative moment T1 and the relative moment T2.

4. The method according to claim 2, wherein the determining timing offset between the to-be-synchronized base station and the reference base station according to a moment at which the reference base station and the to-be-synchronized base station receive a synchronization reference signal that is sent by the reference UE comprises: determining the timing offset ΔT=T1−T2−(TA1−TA2) between the reference base station and the to-be-synchronized base station according to the relative moment T1, the relative moment T2, and the deviation TA1−TA2.

5. The method according to claim 1, before the determining timing offset between the to-be-synchronized base station and the reference base station according to a moment at which the reference base station and the to-be-synchronized base station receive a synchronization reference signal that is sent by the reference UE, further comprising:
  determining a round-trip delay (RTD) measurement result TA1 of the reference UE and the reference base station;
  determining an RTD measurement result TA2 of the reference UE and the to-be-synchronized base station; and
  determining, according to the measurement result TA1 and the measurement result TA2, a deviation TA1−TA2 that is caused by a difference between a distance from the reference UE to the reference base station and a distance from the reference UE to the to-be-synchronized base station.

6. The method according to claim 1, before the determining reference user equipment UE, further comprising:
  determining at least one synchronization group, wherein each synchronization group of the at least one synchronization group comprises at least two base stations; and
  determining the reference base station and the to-be-synchronized base station from the at least two base stations that are comprised in each synchronization group.

7. The method according to claim 6, wherein when the at least one synchronization group comprises multiple synchronization groups, the determining the reference base station and the to-be-synchronized base station from the at least two base stations that are comprised in each synchronization group comprises: determining, from the at least two base stations that are comprised in each synchronization group, a base station that can receive a Global Positioning System (GPS) time service as the reference base station, wherein a frame number and frame timing of the reference base station of each synchronization group are synchronized with the GPS.

8. The method according to claim 1, after the performing calibration on the to-be-synchronized base station according to the timing offset, further comprising:
  when a service is idle, periodically determining the timing offset between the reference base station and the to-be-synchronized base station; and
  when the timing offset is greater than a first threshold and less than a second threshold, enabling the reference base station and the to-be-synchronized base station to perform the frequency synchronization relative to the same clock reference source; or when the timing offset is greater than a second threshold, performing the calibration on the to-be-synchronized base station according to the timing offset, so that the to-be-synchronized base station completes the frame number and frame timing synchronization relative to the reference base station.

9. The method according to claim 1, after the performing calibration on the to-be-synchronized base station according to the timing offset, further comprising: when it is detected that the reference base station or the to-be-synchronized base station restarts, redetermining timing offset, so that the to-be-synchronized base station performs calibration on the to-be-synchronized base station according to the redetermined timing offset and the to-be-synchronized base station completes the frame number and frame timing synchronization relative to the reference base station.

10. A synchronization apparatus, comprising:
  a first determining unit, configured to determine reference UE, wherein the reference UE can communicate with a reference base station and a to-be-synchronized base station at the same time, and the reference base station and the to-be-synchronized base station have completed frequency synchronization relative to a same clock reference source;
  a second determining unit, configured to determine timing offset between the to-be-synchronized base station and the reference base station according to a moment at which the reference base station and the to-be-synchronized base station receive a synchronization reference signal that is sent by the reference UE; and
  a synchronization calibration unit, configured to perform calibration on the to-be-synchronized base station according to the timing offset, so that the to-be-synchronized base station completes frame number and frame timing synchronization relative to the reference base station.

11. The apparatus according to claim 10, wherein the apparatus further comprises a receiving unit, and the receiving unit is configured to:
  receive a moment T1 that is sent by the reference base station and at which the reference base station receives the synchronization reference signal, wherein the moment T1 is a relative moment that is determined based on a current frame number and frame timing of the reference base station and at which the reference base station receives the synchronization reference signal; and
  receive a moment T2 that is sent by the to-be-synchronized base station and at which the to-be-synchronized base station receives the synchronization reference signal, wherein the moment T2 is a relative moment that is determined based on a current frame number and frame timing of the to-be-synchronized base station and at which the to-be-synchronized base station receives the synchronization reference signal.

12. The apparatus according to claim 11, wherein the second determining unit is configured to: determine the timing offset ΔT=T1−T2 between the reference base station and the to-be-synchronized base station according to the relative moment T1 and the relative moment T2.

13. The apparatus according to claim 11, wherein the second determining unit is further configured to: determine the timing offset ΔT=T1−T2−(TA1−TA2) between the reference base station and the to-be-synchronized base station according to the relative moment T1, the relative moment T2, and the deviation TA1−TA2.

14. The apparatus according to claim 10, wherein the second determining unit is further configured to:
  determine a RTD measurement result TA1 of the reference UE and the reference base station;

determine an RTD measurement result TA2 of the reference UE and the to-be-synchronized base station; and determine, according to the measurement result TA1 and the measurement result TA2, a deviation TA1−TA2 that is caused by a difference between a distance from the reference UE to the reference base station and a distance from the reference UE to the to-be-synchronized base station.

15. The apparatus according to claim 10, wherein the first determining unit is further configured to:

determine at least one synchronization group, wherein each synchronization group of the at least one synchronization group comprises at least two base stations; and determine the reference base station and the to-be-synchronized base station from the at least two base stations that are comprised in each synchronization group.

16. The apparatus according to claim 15, wherein when the at least one synchronization group comprises multiple synchronization groups, the first determining unit is configured to: determine, from the at least two base stations that are comprised in each synchronization group, a base station that can receive a GPS time service as the reference base station, wherein a frame number and frame timing of the reference base station of each synchronization group are synchronized with the GPS.

17. The apparatus according to claim 10, wherein the synchronization calibration unit is further configured to:

when a service is idle, periodically determine the timing offset between the reference base station and the to-be-synchronized base station by using the second determining unit; and when the timing offset is greater than a first threshold and less than a second threshold, enable the reference base station and the to-be-synchronized base station to perform the frequency synchronization relative to the same clock reference source; or when the timing offset is greater than a second threshold, perform the calibration on the to-be-synchronized base station according to the timing offset, so that the to-be-synchronized base station completes the frame number and frame timing synchronization relative to the reference base station.

18. The apparatus according to claim 10, wherein the synchronization calibration unit is further configured to: when it is detected that the reference base station or the to-be-synchronized base station restarts, redetermine timing offset by using the second determining unit, and perform calibration on the to-be-synchronized base station according to the redetermined timing offset, so that the to-be-synchronized base station completes the frame number and frame timing synchronization relative to the reference base station.

19. The apparatus according to claim 10, wherein the synchronization reference signal sent by the reference UE comprises at least one of the following:

a physical random access channel (PRACH);

a sounding reference signal (SRS); or a demodulation reference signal (DMRS).

20. The apparatus according to claim 10, wherein networking is performed between the reference base station and the to-be-synchronized base station by using a synchronous Ethernet or a time division multiplexing (TDM) synchronization network.

* * * * *